US012252385B1

(12) United States Patent
Pettus

(10) Patent No.: US 12,252,385 B1
(45) Date of Patent: Mar. 18, 2025

(54) RATCHETING TOOL FOR OIL FILTERS AND CAPS

(71) Applicant: Mark Pettus, Croydon, PA (US)

(72) Inventor: Mark Pettus, Croydon, PA (US)

( * ) Notice: Subject to any disclaimer, the term of this patent is extended or adjusted under 35 U.S.C. 154(b) by 339 days.

(21) Appl. No.: 17/884,693

(22) Filed: Aug. 10, 2022

(51) Int. Cl.
*B67B 7/18* (2006.01)
*B25B 13/46* (2006.01)

(52) U.S. Cl.
CPC .............. *B67B 7/18* (2013.01); *B25B 13/463* (2013.01)

(58) Field of Classification Search
CPC ... B25B 27/0042; B25B 13/463; B25B 13/48; B25B 23/0028; B25B 23/0035; B25B 13/481; B67B 7/18
See application file for complete search history.

(56) References Cited

U.S. PATENT DOCUMENTS 2,913,938 A 11/1959 Yorba
3,048,067 A * 8/1962 Miles .................. B25B 27/0042 81/3.4
3,731,722 A * 5/1973 Carr ........................ B25B 23/12 81/125
4,114,481 A 9/1978 Kowalczyk
4,846,025 A * 7/1989 Keller ................. B25B 27/0042 81/3.4
5,353,666 A * 10/1994 Rogers ................ B25B 27/0042 81/3.4
5,499,557 A * 3/1996 Fry ......................... B25B 17/00 81/125
5,499,561 A * 3/1996 Quinn .................. B65D 75/366 206/349
5,560,269 A * 10/1996 Zelenka .............. B25B 27/0042 81/3.4
5,606,897 A * 3/1997 Quinn ................. B25B 27/0042 206/349
6,006,631 A * 12/1999 Miner ................. B25B 23/0035 81/177.85
6,019,019 A * 2/2000 Hobbs ................... B25B 15/001 81/177.85
6,301,999 B1 * 10/2001 Garg ................... B25B 23/0028 81/63
6,401,575 B1 * 6/2002 Shively ................... B25B 13/48 81/176.15
6,868,758 B2 * 3/2005 Chen ..................... B25B 15/001 81/62
7,143,669 B2 * 12/2006 Hu ...................... B25B 23/0035 81/177.85

(Continued)

*Primary Examiner* — David B. Thomas
(74) *Attorney, Agent, or Firm* — Sanchelima & Associates, P.A.; Jesus Sanchelima; Christian Sanchelima

(57) ABSTRACT

A ratcheting tool for oil filters and caps including a wrench assembly and a socket assembly. The wrench assembly includes a wrench. The wrench has a movable head. The movable head rotates up and down with respect to said wrench. The movable head has an interchangeable drive. The drive is an oil pan drain plug or a square socket drive. The wrench is a ratcheting wrench. The socket assembly includes a socket. An uppermost end of said socket is connected to said drive. A reservoir cap is engaged to the socket. The reservoir cap is rotated and removed from the reservoir through rotating the socket. The socket is rotated when the wrench is rotated. The drive can be attached to predetermined reservoir caps to remove them.

2 Claims, 4 Drawing Sheets

(56) References Cited

U.S. PATENT DOCUMENTS

| | | | | |
|---|---|---|---|---|
| 7,159,491 | B1 * | 1/2007 | Chaconas | B25B 23/0035 81/177.85 |
| 7,284,464 | B2 * | 10/2007 | Chaconas | B25B 13/06 81/58 |
| 7,357,225 | B2 * | 4/2008 | Dorian | F01M 11/0408 184/105.3 |
| 8,459,151 | B2 * | 6/2013 | Wang | B25B 13/463 81/124.3 |
| 8,826,780 | B1 * | 9/2014 | Alho | B25B 13/06 81/124.2 |
| 9,114,508 | B2 * | 8/2015 | Antonio | B25B 13/44 |
| 9,884,414 | B2 * | 2/2018 | DeVecchis | B25B 27/0042 |
| 9,925,650 | B2 * | 3/2018 | Markiewicz | B25B 27/0042 |
| 10,058,982 | B2 * | 8/2018 | Hu | B25B 23/0035 |
| 11,052,516 | B2 * | 7/2021 | Amash | B25B 23/0035 |
| 11,141,841 | B2 * | 10/2021 | Amash | B25B 23/0035 |
| 11,311,990 | B2 * | 4/2022 | Rosales | B25G 1/005 |
| 11,865,677 | B2 * | 1/2024 | MacDonald | B25B 13/56 |
| 11,872,673 | B2 * | 1/2024 | Tseng | B25B 13/48 |
| 2003/0131692 | A1 * | 7/2003 | Huang | B25B 13/463 81/60 |
| 2006/0053983 | A1 * | 3/2006 | Groetsch | B25B 27/0042 81/121.1 |
| 2007/0022847 | A1 * | 2/2007 | Chen | B25B 23/0035 81/177.85 |
| 2009/0324326 | A1 * | 12/2009 | Lin | B25B 15/001 403/322.2 |
| 2010/0212461 | A1 * | 8/2010 | Burt | B25B 13/463 81/58.2 |
| 2012/0198970 | A1 * | 8/2012 | Robidoux | B01D 35/31 81/121.1 |
| 2014/0298959 | A1 * | 10/2014 | Herisse | B25B 13/12 81/129 |
| 2017/0057056 | A1 * | 3/2017 | Hu | B25B 23/0035 |
| 2017/0057060 | A1 * | 3/2017 | Rudy | B67B 7/14 |
| 2017/0182642 | A1 * | 6/2017 | Chou | B25B 13/465 |
| 2017/0203422 | A1 * | 7/2017 | Markous | B25B 27/0042 |
| 2019/0375075 | A1 * | 12/2019 | Thompson | B25B 23/0028 |
| 2019/0375090 | A1 * | 12/2019 | Li | B25B 23/0028 |
| 2021/0046624 | A1 * | 2/2021 | Hsieh | B25B 13/06 |
| 2021/0276166 | A1 * | 9/2021 | Chen | B25B 13/461 |
| 2022/0048169 | A1 * | 2/2022 | Sands | B25B 13/5008 |
| 2022/0080563 | A1 * | 3/2022 | Kuzmic | B25G 1/066 |
| 2023/0347484 | A1 * | 11/2023 | Hasbrouck | B25B 27/0042 |

* cited by examiner

RATCHETING TOOL FOR OIL FILTERS AND CAPS

BACKGROUND OF THE INVENTION

1. Field of the Invention

The present invention relates to a ratcheting tool for oil filters and caps and, more particularly, to a ratcheting tool for oil filters and caps that allows to remove hard to reach oil filler and reservoir caps.

2. Description of the Related Art

Several designs for ratcheting tools have been designed in the past. None of them, however, include the use of a ratcheting wrench to rotate low profile sockets which are engaged to reservoir caps allowing to remove filter or reservoir caps.

Applicant believes that a related reference corresponds to U.S. Pat. No. 4,114,481 issued for an oil filter wrench with a ratcheting drive mechanism. Applicant believes that another related reference corresponds to U.S. Pat. No. 2,913,938 issued for a hand tool for removing threaded caps. None of these references, however, teach of a tool for removing oil filter and reservoir caps on a motor vehicle that is comprised of a ratcheting wrench with a set of low-profile sockets which are configured to engage the indentions on an oil filter or the grooves on a reservoir cap, allowing the user to apply torque to remove the desired component.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a ratcheting tool for oil filters and caps that includes an enlarged ratcheting wrench to access in hard-to-reach areas.

It is another object of this invention to provide a ratcheting tool for oil filters and caps that includes a ratcheting wrench with a movable head to ease maneuvering into the engine compartment.

It is still another object of the present invention to provide a ratcheting tool for oil filters and caps that includes low-profile sockets which are configured to engage the indentions on an oil filter or the grooves on a reservoir cap to rotate and remove oil filter and reservoir caps.

It is another object of the present invention to provide a ratcheting tool for oil filters and caps that includes interchangeable drives to allows connection of the movable head with the movable head or to be attached with a drain plug or any reservoir cap.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
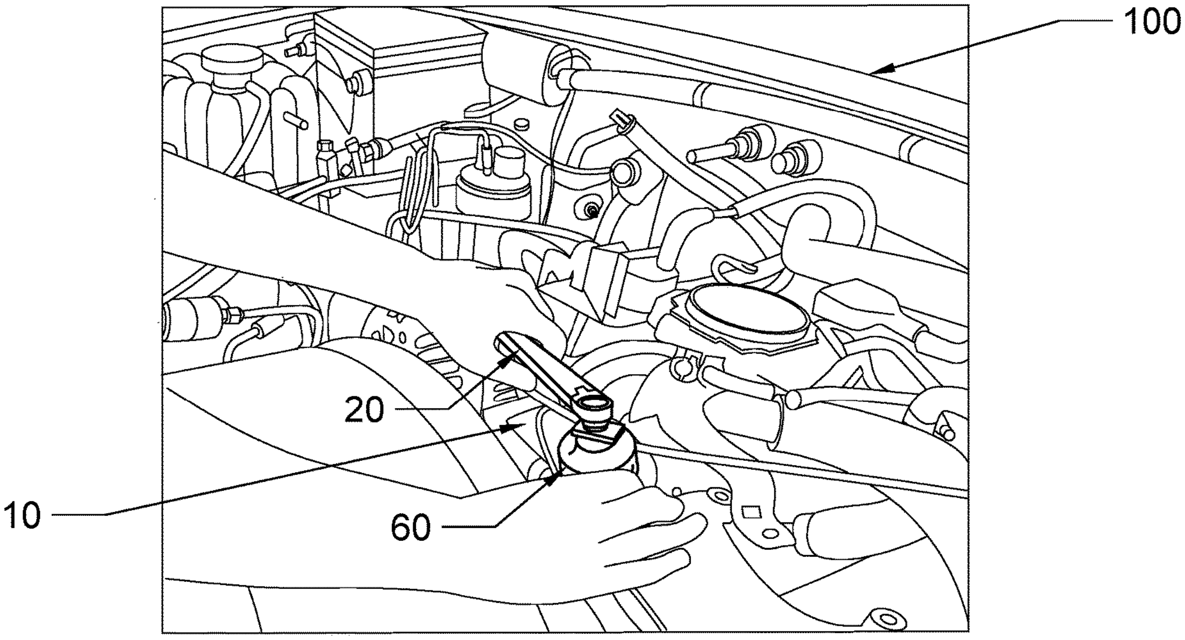
FIG. 1 represents an isometric operational view of the present invention 10 wherein a user is fitting the low-profile socket of the invention 10 in a reservoir cap in the engine compartment of a car 100.

Referring now to the drawings, where the present invention is generally referred to with numeral 10, it can be observed that it basically includes a wrench assembly 20 and a socket assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The wrench assembly 20 may include a handle 22, a movable head 24, a first drive 26 and a second drive 28. The handle 22 may have an elongated rectangular shape. It may be suitable for the handle 22 to have a ring shape, a triangular shape, or any other suitable shape. In a preferred embodiment the handle 22 may be made of metal. It also may be suitable for the handle 22 to be made of rubber, plastic, wood, or any other suitable material. It may be suitable for the handle 22 to have magnetic properties to adhere to metal surfaces. The handle 22 may have a proximal end and a distal end. The proximal end of the handle 22 may have an overture. The overture in the proximal end of the handle 22 may receive the movable head 24.

The movable head 24 may be connected to the handle 22. The movable head 24 and the handle 22 may have a separation to allow the movable head 24 to move. In one embodiment the movable head 24 may rotate upwards and downwards with respect to the handle 22. It also may be suitable for the movable head 24 to rotate to the left or to the right with respect to the handle 22. The movable head 24 may have a substantially circular shape. It also may be suitable for the movable head 24 to have a triangular shape, a triangular shape, or any other suitable shape. The movable head 24 may have a distal end and a proximal end. The distal end of the movable head 24 may have a curved shape. The distal end of the movable head 24 may have an opening. The proximal end of the movable head 24 may have a rectangular shape. The proximal end of the movable head 24 may have a length substantially smaller that the length of the distal end of the movable head 24. The proximal end of the movable head 24 may be coupled to the handle 22 through the overture thereof. The proximal end of the movable head 24 may be coupled to the handle 22 by any means that allows the movable head to rotate upwards and downwards. The opening of the movable head 24 may be used to attach the first drive 26 or the second drive 28 therein. The opening of the movable head 24 may transversally go through the movable head 24. The opening of the movable head 24 may be suitable to receive and secure the first drive 26 or the second drive 28 therein.

Figure 5:
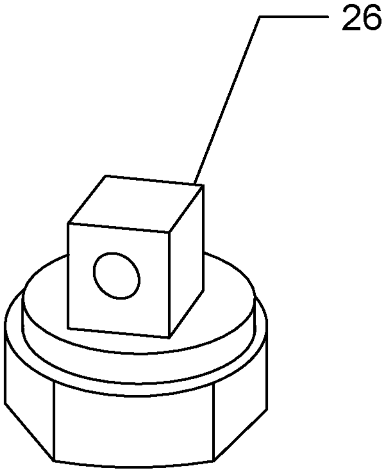
FIG. 5 shows an isometric view of the first drive 26.
Figure 5A:
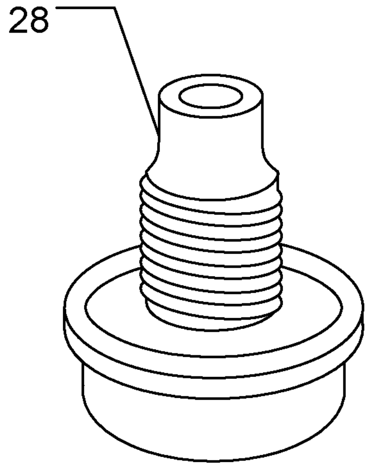
FIG. 5A is a representation of an isometric view of the second drive 28.

As best illustrated in FIG. 5 and FIG. 5A the first drive 26 may be a square socket. The first drive 26 may be a ⅜ square socket. An adapter may be used to attach the first drive 26 to the movable head 24. It also may be suitable for the first drive 26 to be a drive tang, a drive triangular or any other suitable drive. The interior of the opening of the movable head 24 may rotate to use the movable head as a ratcheting wrench. The ratcheting wrenches are known in the prior art as being mechanical devices to tighten and loosens nuts and bolts having two turning directions: one where the wrench head is fixed and another where it spins freely. The first drive 26 may be made of metal, plastic, or any other suitable material. The first drive 26 may be coupled to the movable head in such a way that allows the first drive 26 to spin or be fixed to the movable head 24. The first drive 26 may be detachable from the movable head 24. The first drive 26 may be coupled to the socket assembly 60.

Figure 2:
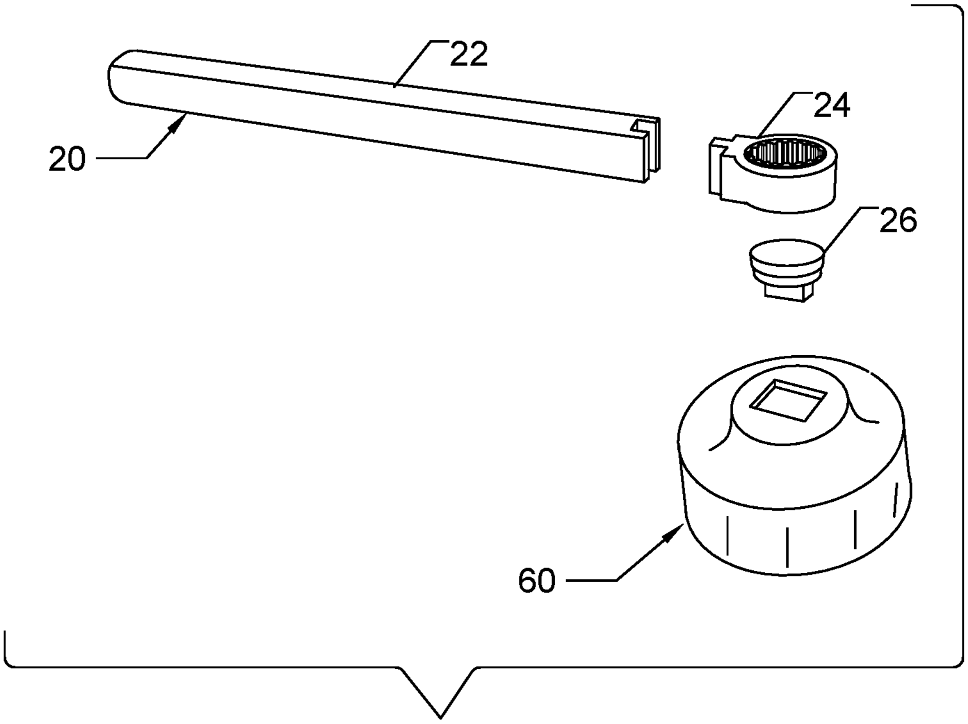
FIG. 2 shows an exploded view of the present invention 10.

The second drive 28 may be an oil pan drain plug. In a preferred embodiment the second drive 28 may be a 13 mm oil pan. An adapter may be used to attach second drive 28 to the movable head 24. It also may be suitable for second drive 28 to be a drive tang, a drive triangular or any other suitable drive. The interior of the opening of the movable head 24 may rotate to use the movable head as a ratcheting wrench. The ratcheting wrenches are known in the prior art as being mechanical devices to tighten and loosens nuts and bolts having two turning directions: one where the wrench head is fixed and another where it spins freely. The second drive 28 may be made of metal, plastic, or any other suitable material. The second drive 28 may be coupled to the movable head 24 in such a way that allows the second drive 28 to spin or be fixed to the movable head 24. The second drive 28 may be detachable from the movable head 24. The first drive 26 and the second drive 28 may be swapped out depending on the needed application. As best illustrated in FIG. 2 the first drive 26 may be engaged to the socket assembly 60 to enclose, engage and remove a cap of a predetermined container. The second drive 28 may be used to remove the drain plug in a car by inserting the bottom portion of the second drive 28 into the drain plug. The first drive 26 and the second drive 28 may have any other configuration to allow detaching a cap through manipulation of the wrench assembly 20.

Figure 3:
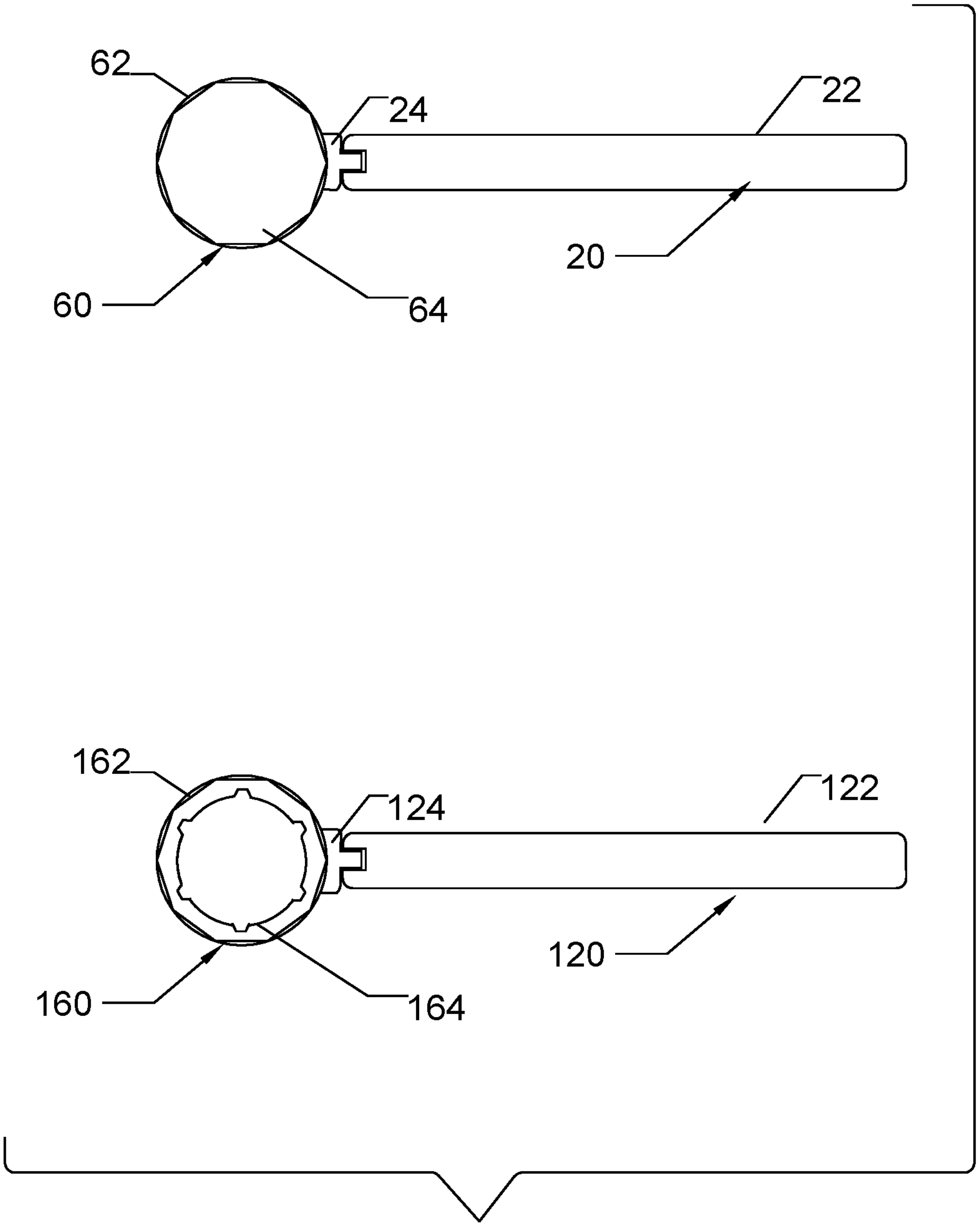
FIG. 3 illustrates a bottom view of the present invention 10 showing two embodiments for the sidewalls 64 of the socket 62.
Figure 4:
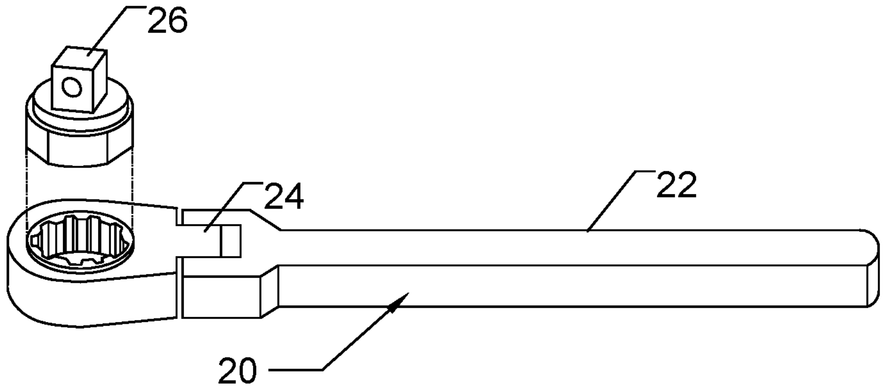
FIG. 4 depicts an isometric view of the wrench assembly 20 having the first drive 26 exploded thereof. The first drive 26 being a square socket.

The socket assembly 60 may include a socket 62. The socket 62 may have side walls 64 and a connecting member 66. The socket 62 may be an oil filter socket, or a degas bottle cap socket. It also may be suitable for the socket 62 to be a pass-through socket, a spark plug socket or any other suitable socket. The socket 62 may be made of metal. It also may be suitable for the socket 62 to be made of plastic, wood, or any other suitable material. It may be suitable for the socket 62 to have isolation. The socket 62 may have a substantially circular shape. The socket 62 may be hollow. The socket 62 may have side walls and a top wall. In one embodiment, as best illustrated in FIG. 3 the inner portion of the side walls 64 may conform with the shape of a decagon. In another embodiment the side walls 64 may have indentations to conform with the shape of a degas bottle cap. The indentations in the side walls 64 as best illustrated in the bottom embodiment of FIG. 3, may help to secure and rotate degas bottle caps, antifreeze bottle caps, radiator bottle caps, or any other suitable cap. It also may be suitable for the side walls 64 to have any other shape that conforms with the shape of reservoir caps. The inner portion of the side walls 64 may be in abutting contact with the external sides of reservoir caps. The inner portion of the side walls 64 may engage to the indentations, prongs, or sides of a reservoir cap. The socket 62 may be secured over the reservoir cap as best shown in FIG. 1. It may be suitable for the inner portion of the side walls 64 to be magnetized to fix metal reservoir cap therein.

The at least one connecting member 66 may be located on the top wall of the socket 62. The at least one connecting member 66 of the socket 62 may be used to connect the drive 26 to the socket 62 The at least one connecting member 66 may have a rectangular shape, a triangular shape, or any other suitable shape. In a preferred embodiment a user may connect the wrench assembly 20 to the socket assembly 60. Different sized sockets 62 may be adapted and fix to the wrench assembly 20 through coupling together the at least one connecting member 66 with the first drive 26 or the second drive 28. As best illustrated in FIG. 1, it also may be suitable to connect the wrench assembly 20 to the socket assembly 60 using an adapter. In a preferred embodiment a user may engage the socket 62 to a reservoir cap, the socket may be connected to the wrench assembly, the user may rotate the inner portion of the movable head 24 through pushing or pulling the handle 22 to rotate and remove the reservoir cap which is engaged to the socket 62.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A ratcheting tool for oil filters and caps, comprising:

a. a wrench assembly, wherein said wrench assembly includes a wrench, said wrench has a handle and a movable head, wherein the handle has an elongated rectangular shape, wherein the handle has magnetic properties, wherein said movable head rotates to the left, right, up and down with respect to the handle, wherein said wrench is a ratcheting wrench, said movable head includes a drive, said drive is a square socket drive; and b. a socket assembly, wherein said socket assembly includes a socket, wherein predetermined-sized sockets are adapted to connect to said movable head by means of said drive, said drive is configured to be inserted in a reservoir cap to remove said reservoir caps, said drive is inserted into a top opening of said socket, said socket has a bottom opening, said opening conforms with the shape of reservoir caps, wherein a reservoir cap is engaged to the inner walls of said socket, wherein said inner walls of the socket are magnetized, said reservoir cap is rotated and removed by means of said wrench.

2. A ratcheting tool for oil filters and caps, consisting of:

a. a wrench assembly, wherein said wrench assembly includes a wrench, wherein said wrench is a ratcheting wrench, said wrench has a movable head and a handle, wherein the handle has a rectangular shape, wherein said handle has magnetic properties, said movable head rotates to the left, right, up and down with respect to said handle, said movable head has a drive, said drive is rotated by means of rotate said handle, said drive is a square socket drive; and b. a socket assembly, wherein said socket assembly includes a socket with magnetized inner walls, said socket has a top opening, said socket has a bottom opening, said top opening conforms with the shape of said drive, said top opening is capable of be attached to said drive, said bottom opening of said socket conforms with the shape of a reservoir cap, said bottom opening is engaged to said reservoir cap, said reservoir cap is rotated and removed by means of rotate said drive, said drive rotates by means of rotate said handle, said drive is capable of be engaged to said reservoir caps.

* * * * *